(12) United States Patent
Johnsen

(10) Patent No.: US 9,604,656 B2
(45) Date of Patent: Mar. 28, 2017

(54) WHEEL CHOCK STORAGE APPARATUSES AND METHODS OF USING THE SAME

(71) Applicant: Holland, L.P., Crete, IL (US)

(72) Inventor: Erik Johnsen, Cedar Lake, IN (US)

(73) Assignee: Holland, L.P., Crete, IL (US)

( * ) Notice: Subject to any disclaimer, the term of this patent is extended or adjusted under 35 U.S.C. 154(b) by 0 days.

(21) Appl. No.: 14/738,469

(22) Filed: Jun. 12, 2015

(65) Prior Publication Data

US 2015/0360701 A1    Dec. 17, 2015

Related U.S. Application Data

(60) Provisional application No. 62/011,412, filed on Jun. 12, 2014.

(51) Int. Cl.
*B61D 3/18* (2006.01)
*B61D 45/00* (2006.01)
*B60P 3/077* (2006.01)

(52) U.S. Cl.
CPC .......... *B61D 3/188* (2013.01); *B61D 45/001* (2013.01); *B60P 3/077* (2013.01)

(58) Field of Classification Search
CPC ........ B61D 3/188; B61D 3/20; B61D 45/001; B60P 3/077; B60P 3/122; B60P 3/07; B60P 3/075; B60P 3/08; B60P 3/06; B60P 3/079
USPC .... 410/30, 7, 19, 3, 9, 115, 104, 16, 97, 91, 410/100; 414/401, 462, 477, 480, 484, 414/563, 400
See application file for complete search history.

(56) References Cited

U.S. PATENT DOCUMENTS

| | | | | |
|---|---|---|---|---|
| 5,011,347 A * | 4/1991 | Bullock | ............... | B61D 45/004 410/10 |
| 5,302,063 A * | 4/1994 | Winsor | ................... | B60P 3/077 188/32 |
| 5,312,213 A * | 5/1994 | Winsor | ................... | B60P 3/077 410/29 |
| 8,047,751 B2 * | 11/2011 | Powers | ..................... | B60T 3/00 410/10 |
| 8,714,375 B2 * | 5/2014 | Peach | ....................... | B60P 3/08 211/106 |

(Continued)

*Primary Examiner* — Glenn Dayoan
*Assistant Examiner* — Sunsurraye Westbrook
(74) *Attorney, Agent, or Firm* — Scherrer Patent & Trademark Law, P.C.; Stephen T. Scherrer; Monique A. Morneault

(57) ABSTRACT

The present invention relates to wheel chock storage apparatuses. Specifically, the present invention provides a storage apparatus for holding auto-rack railcar wheel chocks thereon when not in use within the auto-rack railcars. The wheel chock storage apparatuses of the present invention comprise a flat base sheet or plate of metal or other rigid material, having a generally rectangular or square configuration. Legs bent at roughly ninety degree angles extend from right and left sides of the base sheet or plate. A plurality of apertures or slots may be configured centrally running from top to bottom of the base sheet, and one or more well nuts extend through the apertures or slots for installing to an auto-rack sidewall. A plurality of horizontally-disposed rods may be welded to both bent legs, with each of the plurality of horizontally-disposed rods running laterally across the base sheet from the first leg to the second leg for holding front and/or rear wheel chock teeth.

20 Claims, 3 Drawing Sheets

(56) References Cited

U.S. PATENT DOCUMENTS

2012/0097624 A1* 4/2012 Peach .................. B60P 3/08
                                                                          211/49.1

* cited by examiner

WHEEL CHOCK STORAGE APPARATUSES AND METHODS OF USING THE SAME

The present invention claims priority to U.S. provisional patent application No. 62/011,412, titled "Wheel Chock Storage Apparatuses and Methods of Using the Same", filed Jun. 12, 2014, which is expressly incorporated herein by reference in its entirety.

TECHNICAL FIELD

The present invention relates to wheel chock storage apparatuses. Specifically, the present invention provides a storage apparatus for holding auto-rack railcar wheel chocks thereon when not in use within the auto-rack railcars. The wheel chock storage apparatuses of the present invention comprise a flat base sheet or plate of metal or other rigid material, having a generally rectangular or square configuration. Legs bent at roughly ninety degree angles extend from right and left sides of the base sheet or plate. A plurality of apertures or slots may be configured centrally running from top to bottom of the base sheet, and one or more well nuts extend through the apertures or slots for installing to an auto-rack sidewall. A plurality of horizontally-disposed rods may be welded to both bent legs, with each of the plurality of horizontally-disposed rods running laterally across the base sheet from the first leg to the second leg for holding front and/or rear wheel chock teeth.

BACKGROUND

Auto-rack railcars are generally used to transport vehicles from one location to another over the railroad systems around the world. Various mechanisms and strategies have been utilized to ensure that vehicles remain in their positions during transport, as movement of the vehicles may cause damage to the vehicles and/or to the auto-rack railcar itself.

One mechanism to minimize or otherwise prevent movement of vehicles involves using a vehicle restraint system, such as wheel chocks, strategically positioned adjacent to a vehicle's wheels to restrain the movement of the wheels longitudinally and/or laterally. Wheel chocks are typically made from blocks of rigid material in the shape of a ramp. The ramp portions of the wheel chocks are positioned immediately adjacent the tread of a tire of a vehicle, and are disposed so as not to move, thereby preventing movement of the vehicle.

Auto-rack railcars typically have multiple levels, where a vehicle may be positioned on one of the multiple levels. Therefore, space within an auto-rack railcar may be maximized. Each level typically has a metal grating for a floor, and the wheel chocks are locked into the gratings by teeth or hooks that may extend from the wheel chocks and engage the metal grating, thereby locking the wheel chocks to the metal grating floor.

Once the vehicles are transported to their destinations, the wheel chocks are removed from adjacent the vehicles' wheels, moved out of the way and stored. Otherwise, the wheel chocks may be damaged if run over by the vehicles as the vehicles are unloaded. In addition, they can pose a hazard for individuals who may trip over them, causing injury. Thus, wheel chocks must be stored out of the way so as not to be damaged. Often, wheel chocks are stored against the walls of the auto-rack railcar when not in use. Often, however, wheel chocks cannot be disposed easily on the walls of auto-rack railcars because the walls are typically not made from the same grating as attached to the floors, and the wheel chocks cannot engage the walls as they can on the grating attached to the floors.

It is important that wheel chocks be held securely on the walls of the auto-rack railcars when stored. Often, cars may be coupled and decoupled from each other, causing jarring of the cars. If not secured properly, the wheel chocks may fall off the walls, which may cause damage to the wheel chocks.

Storage pans are typically used to hold wheel chocks on the walls of auto-rack railcars to ensure that the wheel chocks are not jostled or subject to falling off of the walls. The storage pans typically provide a surface for the teeth or hooks of a wheel chock to lock onto, securing the same on the walls of an auto-rack railcar. The storage pans are typically bolted to the side walls of the auto-rack railcars, such as within apertures already present on the walls of the auto-rack railcar. The wheel chocks may thus engage metal bars or the like on the storage pans, holding the wheel chocks in place. A need, however, exists for improved wheel chock storage apparatuses. Specifically, a need exists for improved wheel chock storage apparatuses that securely hold wheel chocks against the wall of an auto-rack railcar.

Oftentimes, however, existing storage pans do not allow for the storage of the myriad different types of wheel chocks in existence on the market, or coming into existence on the market. When a different or new type of wheel chock is introduced, auto-rack railcar owners do not want to purchase new storage pans to securely hold the different or new type of wheel chocks. A need, therefore, exists for improved wheel chock storage apparatuses that securely hold many of the different and/or new wheel chocks that are used in the marketplace. Specifically, a need exists for improved wheel chock storage apparatuses that may be useful for many different types of wheel chocks.

Often, storage pans utilize a large amount of material and are difficult to manufacture, requiring several different metal structures that must be welded together to form the useful storage pans. A need, therefore, exists for improved wheel chock storage apparatuses that are simple to manufacture. Moreover, a need exists for improved wheel chock storage apparatuses that minimize materials and cost of manufacture.

SUMMARY OF THE INVENTION

The present invention relates to wheel chock storage apparatuses. Specifically, the present invention provides a storage apparatus for holding auto-rack railcar wheel chocks thereon when not in use within the auto-rack railcars. The wheel chock storage apparatuses of the present invention comprise a flat base sheet or plate of metal or other rigid material, having a generally rectangular or square configuration. Legs bent at roughly ninety degree angles extend from right and left sides of the base sheet or plate. A plurality of apertures or slots may be configured centrally running from top to bottom of the base sheet, and one or more well nuts extend through the apertures or slots for installing to an auto-rack sidewall. A plurality of horizontally-disposed rods may be welded to both bent legs, with each of the plurality of horizontally-disposed rods running laterally across the base sheet from the first leg to the second leg for holding front and/or rear wheel chock teeth.

To this end, in an embodiment of the present invention, a wheel chock storage apparatus is provided. The wheel chock storage apparatus comprises a flat base sheet made of metal having a generally rectangular or square configuration; first and second legs on first and second sides, respectively, of the flat base sheet bent at roughly ninety degree angles; a plurality of apertures configured centrally and running from top to bottom of the base sheet; one or connection means for connecting the base sheet to an auto-rack railcar wall, and a plurality of horizontally-disposed rods welded to both bent legs running laterally across the base sheet from the first leg to the second leg.

It is, therefore, an advantage and objective of the present invention to provide improved wheel chock storage apparatuses.

Specifically, it is an advantage and objective of the present invention to provide improved wheel chock storage apparatuses that securely hold wheel chocks against the wall of an auto-rack railcar.

In addition, it is an advantage and objective of the present invention to provide improved wheel chock storage apparatuses that securely hold many of the different and/or new wheel chocks that are used in the marketplace.

More specifically, it is an advantage and objective of the present invention to provide improved wheel chock storage apparatuses that may be useful for many different types of wheel chocks.

Further, it is an advantage and objective of the present invention to provide improved wheel chock storage apparatuses that are simple to manufacture.

Still further, it is an advantage and objective of the present invention to provide improved wheel chock storage apparatuses that minimize materials and cost of manufacture.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to wheel chock storage apparatuses. Specifically, the present invention provides a storage apparatus for holding auto-rack railcar wheel chocks thereon when not in use within the auto-rack railcars. The wheel chock storage apparatuses of the present invention comprise a flat base sheet or plate of metal or other rigid material, having a generally rectangular or square configuration. Legs bent at roughly ninety degree angles extend from right and left sides of the base sheet or plate. A plurality of apertures or slots may be configured centrally running from top to bottom of the base sheet, and one or more well nuts extend through the apertures or slots for installing to an auto-rack sidewall. A plurality of horizontally-disposed rods may be welded to both bent legs, with each of the plurality of horizontally-disposed rods running laterally across the base sheet from the first leg to the second leg for holding front and/or rear wheel chock teeth.

Figure 1:
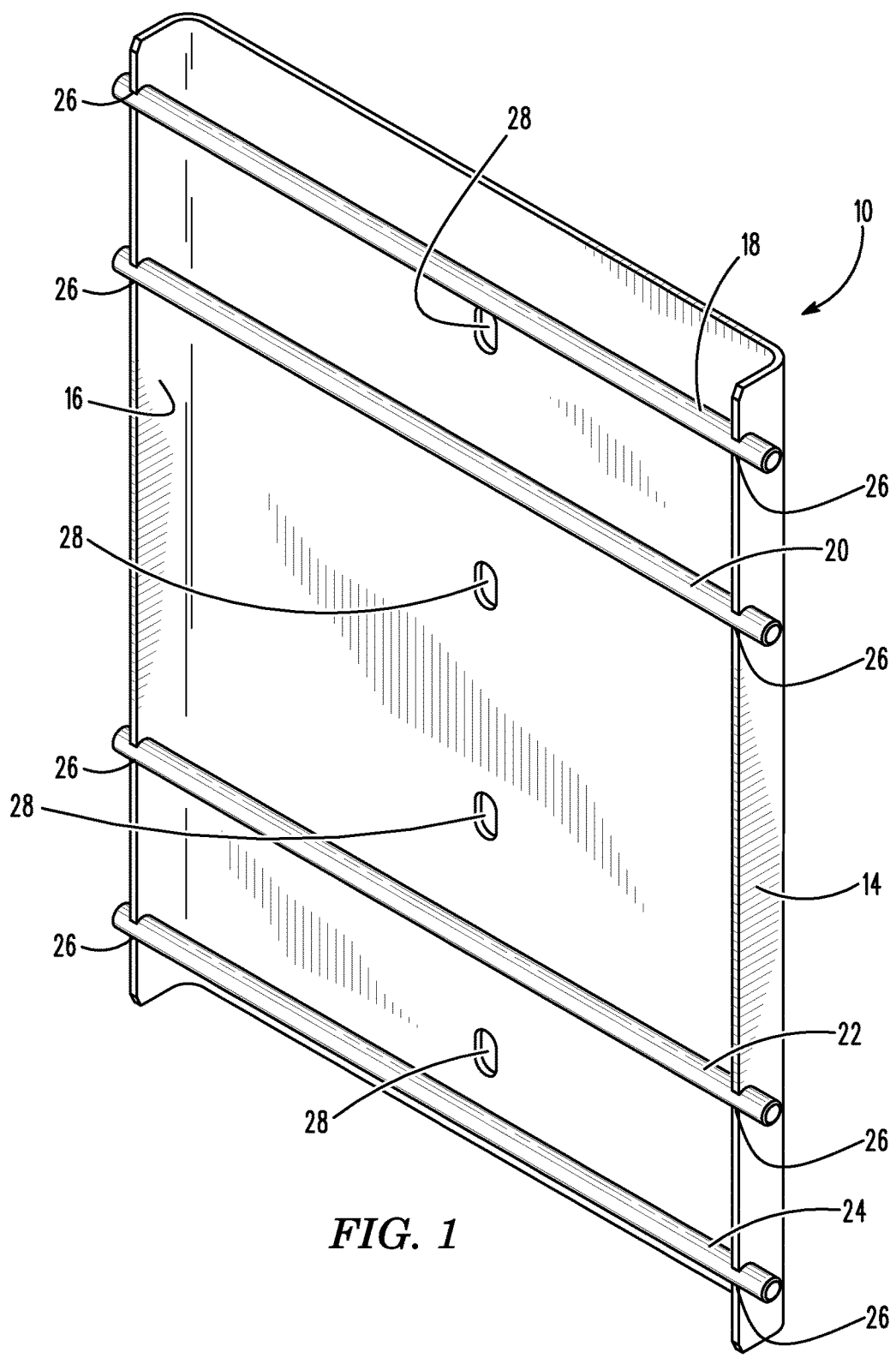
FIG. 1 illustrates a perspective view of a wheel chock storage apparatus in an embodiment of the present invention.

Now referring to the figures, wherein like numerals refer to like parts, FIG. 1 illustrates a wheel chock storage apparatus 10 of the present invention, comprising a flat base sheet 12 forming generally a rectangular or square configuration, although it should be apparent that the base sheet may be any shape apparent to one of ordinary skill in the art and the shape of the present invention should not be limited as described herein. The base sheet may preferably be made of metal, such as steel, or any other rigid and strong material that allows it to hold the weight of a wheel chock disposed thereon without structurally failing. Moreover, the base sheet may be electroplated to protect the base sheet metal from oxidation, thereby maintaining its strength and physical integrity when used to store wheel chocks in an auto-rack railcar. Specifically, the wheel chock storage apparatus 10 may be exposed to weather conditions, such as rain, snow, extreme cold or heat, sunlight, or the like.

First and second legs 14, 16 may extend from the base sheet and may also be made of the same material as the base sheet 12. Preferably, the legs 14, 16 may be bent flange portions that may extend from the right and left sides of the base sheet 12 at roughly ninety degrees relative to the base sheet 12 and extend roughly perpendicularly away from the base sheet 12.

A plurality of rods 18, 20, 22, 24 may extend from the first and second legs 14, 16 to form attachment surfaces for wheel chocks to be held thereon. The rods 18, 20, 22, 24 may be placed in various locations in proximity to the top of the base sheet 12, the bottom of the base sheet 12, and in near the middle of the base sheet 12, relative to the top and bottom thereof. The plurality of rods 18, 20, 22, 24 may extend laterally from the first leg 14 to the second leg 16, and may be welded to the first leg 14 and the second leg 16, respectively. Specifically, the first and second legs 14, 16 may have a plurality of cut-out portions 26 therein allowing the rods 18, 20, 22, 24 to reside therein and be welded thereto. The cut-out portions 26 may seat the rods 18, 20, 22, 24 in proper locations on the first and second legs 14, 16 so that the rods 18, 20, 22, 24 may be easily welded to the first and second legs 14, 16. Moreover, the cut-out portions 26 may provide structural strength and retain the rods 18, 20, 22, 24 therein, preventing or minimizing movement of the rods if the welds fail.

Figure 2:
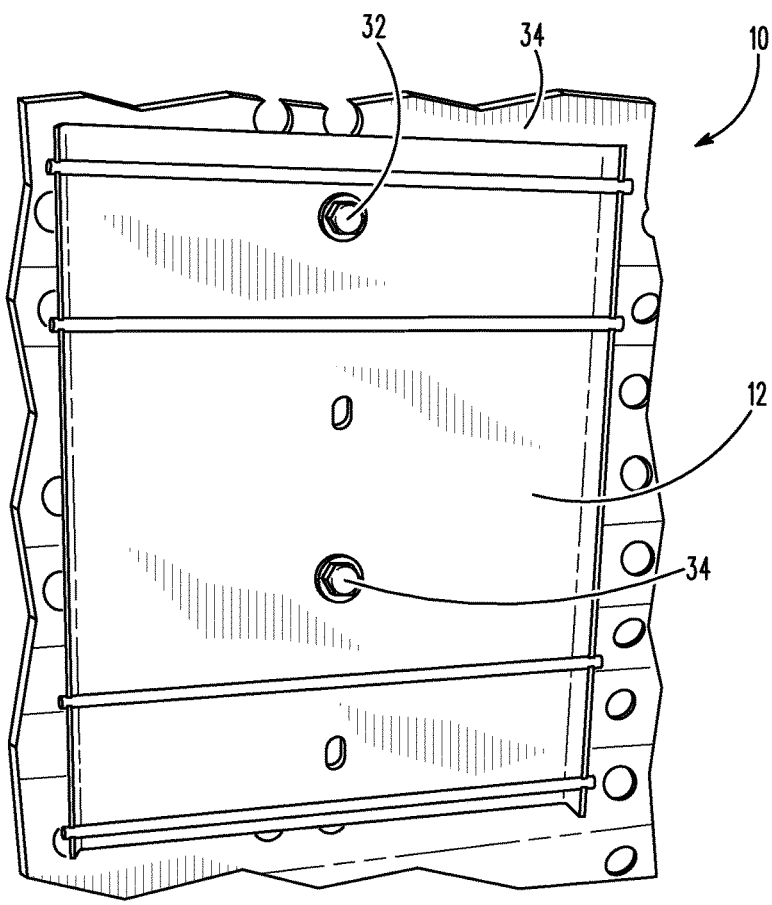
FIG. 2 illustrates a front view of a wheel chock apparatus attached to an auto-rack railcar wall in an embodiment of the present invention.

Disposed centrally on the flat sheet 12 and running roughly from top to bottom of the flat sheet 12 may be a plurality of apertures or slots 28 that may be used to bolt the apparatus 10 to an auto-rack railcar wall 34, as illustrated in FIG. 2. Specifically, bolts 30, 32 may be disposed through the apertures or slots 28 and held onto the auto-rack railcar wall 34 (as illustrated in FIG. 2) with nuts, such as, preferably, well nuts, that may rigidly hold the apparatus 10 to the auto-rack railcar wall 34. Of course, any other connecting means may be utilized as apparent to one of ordinary skill in the art, and the present invention should not be limited as described herein. The plurality of apertures or slots 28 may be at various locations to closely align with matching apertures in the auto-rack railcar wall 34 for attachment thereto. It is preferable that the apertures or slots 28 be disposed centrally in the flat sheet 12 so that, when bolted to the auto-rack railcar wall, it maintains a central balance to aid in holding a wheel chock thereon.

Figure 3:
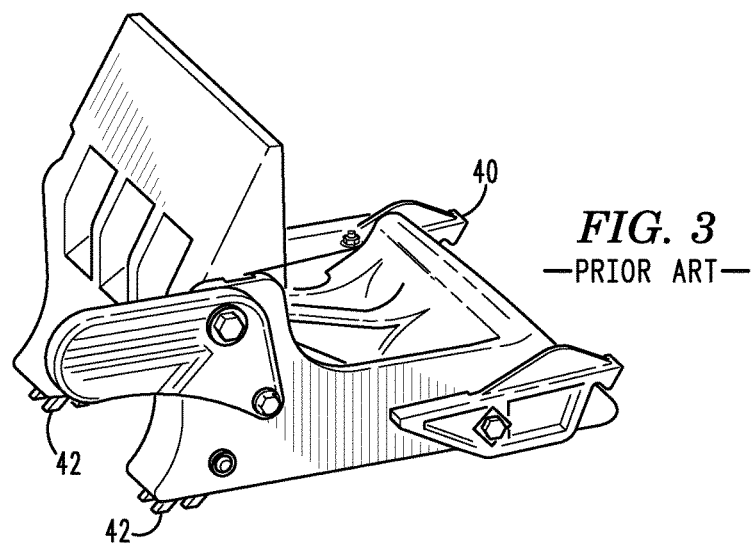
FIG. 3 illustrates a prior art wheel chock for attaching to a wheel chock storage apparatus of the present invention.
Figure 4:
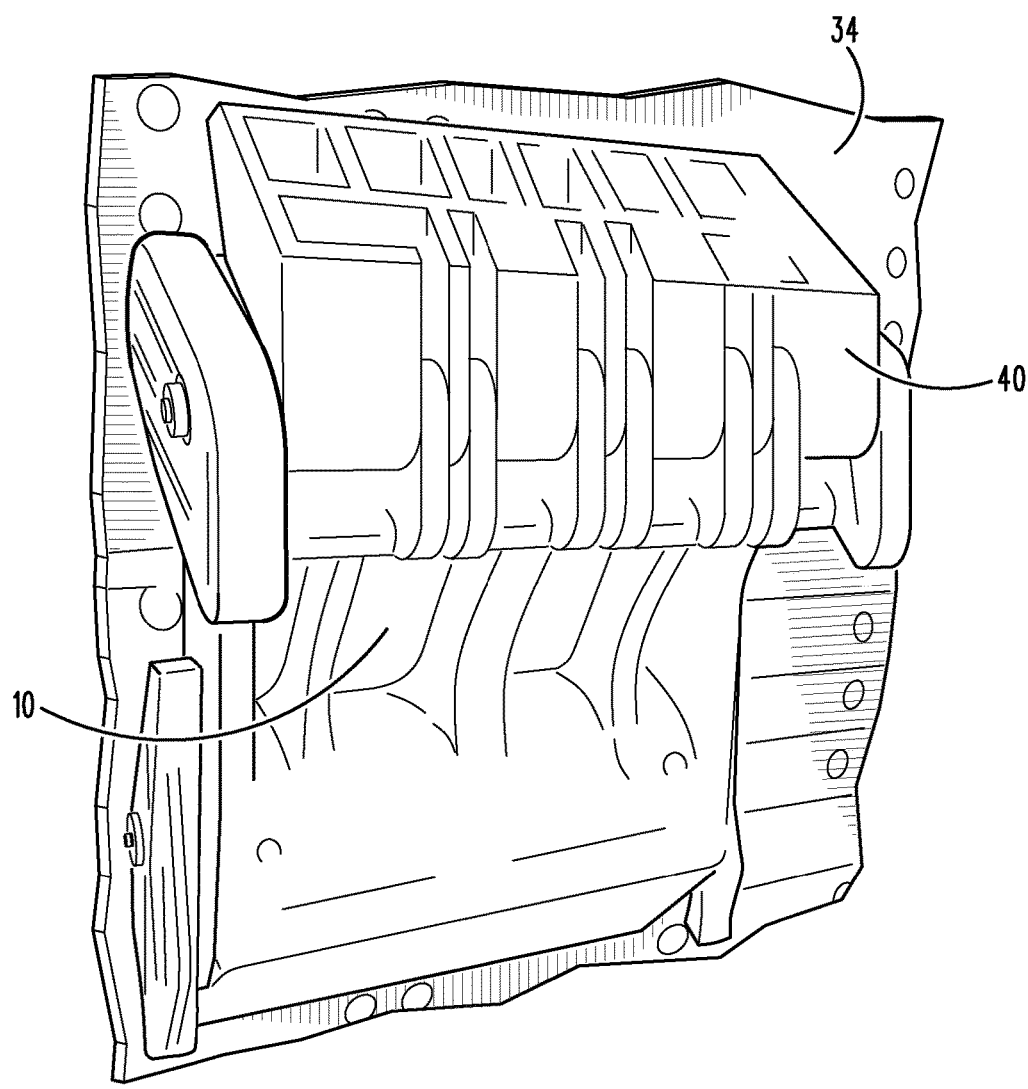
FIG. 4 illustrates a wheel chock attached to a wheel chock storage apparatus that is connected to an auto-rack railcar wall in an embodiment of the present invention.

FIG. 3 shows a prior art wheel chock 40 that may be stored on the wheel chock storage apparatus 10 of the present invention. The wheel chock 40 may have a plurality of teeth 42 extending therefrom, and the teeth 42 may be engageable and/or connectable to one or more of the plurality of rods 18, 20, 22, 24. The size, strength, diameter, and other physical structural features of the rods 18, 20, 22, 24 allow the wheel chock 40 to easily connect thereto, as illustrated in FIG. 4, which shows a prior art wheel chock 40 attached to a wheel chock apparatus 10, in turn connected to an auto-rack railcar wall 34.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. A wheel chock storage apparatus comprising:
   a flat base sheet made of metal having a generally rectangular or square configuration and having a top edge, a bottom edge, a first side edge and a second side edge, and further having a first portion disposed at the first side edge of the flat base sheet and extending from the top edge to the bottom edge of the flat base sheet, a second portion disposed at the second side edge of the flat base sheet, and a central portion between the first portion and the second portion, the first portion, the second portion and the central portion formed from a continuous sheet of metal,
   wherein the first portion extends roughly perpendicularly from the central portion forming a first leg and wherein the second portion extends roughly perpendicularly from the central portion forming a second leg on the first and second sides, respectively, of the flat base sheet;
   a plurality of apertures configured centrally and running from top to bottom of the base sheet;
   one or more connection means for connecting the base sheet to an auto-rack railcar wall; and
   a plurality of horizontally-disposed rods welded to the first and the second legs running laterally across the base sheet from the first leg to the second leg.

2. The wheel chock storage apparatus of claim 1 wherein a first of the plurality of horizontally-disposed rods is disposed in proximity to the top of the flat base sheet.

3. The wheel chock storage apparatus of claim 2 wherein a second of the plurality of horizontally-disposed rods is disposed in proximity to the bottom of the flat base sheet.

4. The wheel chock storage apparatus of claim 3 wherein a third of the plurality of horizontally-disposed rods is disposed between the first horizontally-disposed rod and a midpoint of the flat base sheet.

5. The wheel chock storage apparatus of claim 3 wherein a third of the plurality of horizontally-disposed rods is disposed between the second horizontally-disposed rod and a midpoint of the flat base sheet.

6. The wheel chock storage apparatus of claim 4 wherein a fourth of the plurality of horizontally-disposed rods is disposed between the second horizontally-disposed rod and a midpoint of the flat base sheet.

7. The wheel chock storage apparatus of claim 5 wherein a fourth of the plurality of horizontally-disposed rods is disposed between the first horizontally-disposed rod and a midpoint of the flat base sheet.

8. The wheel chock storage apparatus of claim 1 wherein the first leg comprises at least one aperture, and wherein an end of one of the plurality of horizontally-disposed rods is welded within the aperture.

9. The wheel chock storage apparatus of claim 1 wherein the first and the second legs each further comprise a plurality of apertures and further wherein each end of the plurality of horizontally-disposed rods is welded within one of the plurality of apertures.

10. A system for storing auto-rack railcar wheel chocks comprising the wheel chock apparatus of claim 1, further comprising:
    an auto-rack railcar wheel chock comprising a plurality of teeth, wherein the plurality of teeth are configured to engage at least one of the plurality of horizontally-disposed rods of the wheel chock storage apparatus.

11. The system of claim 10 wherein the one or more connection means includes bolts configured to hold the wheel chock storage apparatus onto the wall of an auto-rack railcar.

12. A method of storing auto-rack railcar wheel chocks comprising the steps of:
    providing a wheel chock storage apparatus comprising a flat base sheet made of metal having a generally rectangular or square configuration and having a top edge, a bottom edge, a first side edge and a second side edge, and further having a first portion disposed at the first side edge of the flat base sheet and extending from the top edge to the bottom edge of the flat base sheet, a second portion disposed at the second side edge of the flat base sheet extending from the top edge to the bottom edge of the flat base sheet, and a central portion between the first portion and the second portion, the first portion, the second portion and the central portion formed from a continuous sheet of metal, wherein the first portion extends roughly perpendicularly from the central portion forming a first leg and wherein the second portion extends roughly perpendicularly from the central portion forming a second leg on the first and second sides, respectively, of the flat base sheet bent at roughly ninety degree angles, a plurality of apertures configured centrally and running from top to bottom of the base sheet, one or more connection means for connecting the base sheet to an auto-rack railcar wall, and a plurality of horizontally-disposed rods welded to the first and the second legs running laterally across the base sheet from the first leg to the second leg; and
    providing an auto-rack railcar wheel chock configured to hold a tire of an automobile immobile during transport and comprising a plurality of teeth, wherein the plurality of teeth are configured to engage at least one of the plurality of horizontally-disposed rods on the wheel chock storage apparatus; and
    connecting the wheel chock storage apparatus to the auto-rack railcar wall; and
    attaching the auto-rack wheel chock onto the wheel chock storage apparatus so that the teeth of the auto-rack wheel chock resiliently engage at least one of the horizontally-disposed rods of the wheel chock storage apparatus.

13. The method of claim 12 wherein a first of the plurality of horizontally-disposed rods is disposed in proximity to the top of the flat base sheet.

14. The method of claim 13 wherein a second of the plurality of horizontally-disposed rods is disposed in proximity to the bottom of the flat base sheet.

15. The method of claim 14 wherein a third of the plurality of horizontally-disposed rods is disposed between the first horizontally-disposed rod and a midpoint of the flat base sheet.

16. The method of claim 14 wherein a third of the plurality of horizontally-disposed rods is disposed between the second horizontally-disposed rod and a midpoint of the flat base sheet.

17. The method of claim 15 wherein a fourth of the plurality of horizontally-disposed rods is disposed between the second horizontally-disposed rod and a midpoint of the flat base sheet.

18. The method of claim 17 wherein a fourth of the plurality of horizontally-disposed rods is disposed between the first horizontally-disposed rod and a midpoint of the flat base sheet.

19. The method of claim 12 wherein the first leg comprises at least one aperture, and further wherein an end of one of the plurality of horizontally-disposed rods is welded within the aperture.

20. The method of claim 12 wherein the legs further comprise a plurality of apertures and further wherein each end of the plurality of horizontally-disposed rods is welded within one of the plurality of apertures.

* * * * *